(12) United States Patent
Asatekin Alexiou et al.

(10) Patent No.: US 11,421,061 B2
(45) Date of Patent: *Aug. 23, 2022

(54) ZWITTERION-CONTAINING MEMBRANES

(71) Applicant: Trustees of Tufts College, Medford, MA (US)

(72) Inventors: Ayse Asatekin Alexiou, Arlington, MA (US); Prity Bengani-Lutz, Woburn, MA (US)

(73) Assignee: Trustees of Tufts College, Medford, MA (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/820,125

(22) Filed: Mar. 16, 2020

(65) Prior Publication Data

US 2021/0039054 A1 Feb. 11, 2021

Related U.S. Application Data

(63) Continuation of application No. 16/529,154, filed on Aug. 1, 2019, now abandoned, which is a (Continued)

(51) Int. Cl.
  *C08F 220/18* (2006.01)
  *B01D 71/76* (2006.01)
  (Continued)

(52) U.S. Cl.
  CPC ........ *C08F 220/1802* (2020.02); *B01D 69/02* (2013.01); *B01D 69/12* (2013.01);
  (Continued)

(58) Field of Classification Search
  CPC .. C08F 293/005; C08F 220/56; C08F 293/00; G03F 7/0046; G03F 7/3071; C08L 33/06; C08L 53/00; C08K 3/346; B01D 2325/18; B01D 71/76; B01D 69/12; B01D 71/28; B01D 71/42; B01D 71/68; C08G 2261/143
  See application file for complete search history.

(56) References Cited

U.S. PATENT DOCUMENTS 3,473,998 A 10/1969 Spriestersbach et al.
7,985,339 B2 7/2011 Zhang et al.
(Continued)

FOREIGN PATENT DOCUMENTS

WO WO-2011/088505 A1 7/2011

OTHER PUBLICATIONS

An et al., "Study on a Novel Nanofiltration Mambrane Prepared by Interfacial Polymerization with Zwitterionic Amine Monomers," Journal of Membrane Science, 431:171-179 (2013).
(Continued)

*Primary Examiner* — Patrick Orme
(74) *Attorney, Agent, or Firm* — Foley Hoag LLP; Dana M. Gordon; Laura A. Wzorek (57) ABSTRACT

Disclosed is a statistical copolymer that includes both zwitterionic repeat units and hydrophobic repeat units, and a filtration membrane that contains a selective layer formed of the statistical copolymer. Also disclosed are methods of preparing the above-described filtration membrane.

21 Claims, 5 Drawing Sheets

Related U.S. Application Data continuation of application No. 16/211,985, filed on Dec. 6, 2018, now abandoned, which is a continuation of application No. 15/034,454, filed as application No. PCT/US2014/064528 on Nov. 7, 2014, now Pat. No. 10,150,088.

(60) Provisional application No. 61/901,624, filed on Nov. 8, 2013.

(51) Int. Cl.

| | |
|---|---|
| B01D 69/02 | (2006.01) |
| B01D 69/12 | (2006.01) |
| B01D 71/42 | (2006.01) |
| B01D 71/68 | (2006.01) |
| B01D 71/80 | (2006.01) |
| C08F 220/48 | (2006.01) |
| B01D 71/28 | (2006.01) |
| B01D 71/44 | (2006.01) |
| C08F 220/22 | (2006.01) |
| B01D 67/00 | (2006.01) |

(52) U.S. Cl.
CPC ............ B01D 71/28 (2013.01); B01D 71/42 (2013.01); B01D 71/44 (2013.01); B01D 71/68 (2013.01); B01D 71/76 (2013.01); B01D 71/80 (2013.01); C08F 220/22 (2013.01); C08F 220/48 (2013.01); B01D 67/0006 (2013.01); B01D 67/0081 (2013.01); B01D 2325/02 (2013.01); B01D 2325/18 (2013.01); B01D 2325/30 (2013.01); B01D 2325/38 (2013.01)

(56) References Cited

U.S. PATENT DOCUMENTS

| | | | |
|---|---|---|---|
| 8,236,899 B2 | 8/2012 | Millward et al. | |
| 8,236,988 B2 | 8/2012 | Chockalingam | |
| 8,550,256 B1 | 10/2013 | Diep et al. | |
| 10,150,088 B2 * | 12/2018 | Alexiou | B01D 71/68 |
| 2006/0264563 A1 | 11/2006 | Hanrahan et al. | |
| 2007/0185264 A1 | 8/2007 | Seo | |
| 2008/0312349 A1 | 12/2008 | Yeager et al. | |
| 2011/0143620 A1 | 6/2011 | Wu | |
| 2011/0160392 A1 | 6/2011 | Chang et al. | |
| 2011/0205872 A1 | 8/2011 | Sakai et al. | |
| 2012/0259021 A1 | 10/2012 | Jiang et al. | |
| 2013/0112618 A1 | 5/2013 | Diallo et al. | |
| 2013/0165538 A1 | 6/2013 | Ehrenberg et al. | |
| 2016/0303523 A1 | 10/2016 | Alexiou et al. | |
| 2017/0185264 A1 | 6/2017 | Wang et al. | |
| 2018/0001278 A1 | 1/2018 | Alexiou et al. | |

OTHER PUBLICATIONS

Bredas et al., "Head-Head Interactions in Zwitterionic Associating Polymers," Macromolecules, 21:1633-1639 (1988).

Ehrmann et al., "Statistical n-Butyl Acrylate-Sulfopropyl Betaine Copolymers. 3. Domain Size Determination by Solid-State NMR Spectroscopy," Macromolecules, 26:988-993 (1992).

Georgiev et al., "Self-Assembly, Antipolyelectrolyte Effect, and Nonbiofouling Properties of Polyzwitterions," Biomacromolecules, 7:1329-1334 (2006).

Inoue et al., "Dynamic Motion of Phosphorylcholine Groups at the Surface of Poly(2-Methacryloyloxyethyl Phosphorycholine-Random-2,2,2-Trifluoroethyl Methacrylate)," Journal of Colloid and Interface Science, 274:465-471 (2004).

Laschewsky, "Structures and Synthesis of Zwitterionic Polymers," Polymers, 6:1544-1601 (2014).

Sun et al., "Improved Antifouling Property of Zwitterionic Ultrafiltration Membrane Composed of Acrylonitrile and Sulfobetaine Copolymer," Journal of Membrane Science, 285:299-305 (2006).

Sun et al., "Novel Thin-Film Composite Nanofiltration Hollow Fiber Membranes with Double Repulsion for Effective Removal of Emerging Organic Matters form Water," Journal of Membrane Science, 401:152-162 (2012).

Wang et al., "Highly Efficient Antifouling Ultrafiltration Membranes Incorporating Zwitterionic Poly(3-(Methacryloylamino)Propyl]-Dimethyl(3-Sulfopropyl) Ammonium Hydroxide)," Journal of Membrane Science, 340:164-170 (2009).

Wu et al., "Influence of Zwitterions on Thermomechanical Properties and Morphology of Acrylic Copolymers: Implications for Electroactive Applications," Macromolecules, 44:8056-8063 (2011).

Zhou et al., "Fabrication and Characterization of Novel Composite Nanofiltration Membranes Based on Zwitterionic O-Carboxymethyl Chitosan," Desalination, 317:67-76 (2013).

* cited by examiner

FIG. 1
Two SEM images

PMMA-r-SBMA composite membrane showing a dense 5 μm selective layer

Uncoated PVDF400 base membrane

SEM images of two PTFEMA-r-SBMA coated membranes showing dense coatings

Sample 6-2, with 1 μm thick coating formed by lower doctor blade gap.

Sample 6-1, with 6 μm thick coating formed by a higher doctor blade gap.

FIG. 4

Rejection of anionic dyes of different calculated molecular diameters by three zwitterionic copolymer membranes after annealing

ZWITTERION-CONTAINING MEMBRANES

RELATED APPLICATIONS

This application is a continuation of U.S. patent application Ser. No. 16/529,154, filed Aug. 1, 2019, which is a continuation of U.S. patent application Ser. No. 16/211,985, filed Dec. 6, 2018, which is a continuation of U.S. patent application Ser. No. 15/034,454, filed May 4, 2016, now U.S. Pat. No. 10,150,088, which is the National Stage of International Application No. PCT/US2014/064528, filed Nov. 7, 2014, which claims the benefit of priority to U.S. Provisional Application No. 61/901,624, filed Nov. 8, 2013.

BACKGROUND

Filtration membranes are useful for purification and separation in the food, beverage, dairy, and pharmaceutical industries.

Filtration membranes used for separation must overcome three major obstacles: low permeability, fouling, and poor selectivity. Membranes with high permeability promote energy savings and cost efficiency. Membrane fouling, i.e., loss of permeability due to absorption and adhesion of feed components, causes low productivity and high energy use. High selectivity, very important in every application, depends on membrane pore size.

There is a need to develop a membrane that is highly permeable, selective, and anti-fouling.

SUMMARY

This invention is based on an unexpected discovery of certain anti-fouling membranes that have both a high water permeability and a high selectivity.

One aspect of this invention relates to a statistical copolymer having a molecular weight of 10,000 to 10,000,000 Dalton (e.g., 20,000 to 2,000,000 Dalton and 30,000 to 500,000 Dalton). The statistical copolymer contains zwitterionic repeat units and hydrophobic repeat units. Examples include poly((methyl methacrylate)-random-(sulfobetaine methacrylate)), poly((trifluoroethyl methacrylate)-random-(sulfobetaine methacrylate)), poly((acrylonitrile)-random-(sulfobetaine methacrylate)), poly((trifluoroethyl methacrylate)-random-(3-(2-vinylpyridinium-1-yl)propane-1-sulfonate)), and poly((acrylonitrile)-random-(3-(4-vinylpyridinium-1-yl)propane-1-sulfonate)).

The zwitterionic repeat units, constituting 25-75% (e.g., 30-75% and 30-70%) by weight of the statistical copolymer, each can contain independently one or more of the following functional groups: sulfobetaine, carboxybetaine, phosphorylcholine, and pyridinium alkyl sulfonate. They can be formed independently from sulfobetaine acrylate, sulfobetaine acrylamide, phosphorylcholine acrylate, phosphorylcholine acrylamide, phosphorylcholine methacrylate, carboxybetaine acrylate, carboxybetaine methacrylate, carboxybetaine acrylamide, 3-(2-vinylpyridinium-1-yl)propane-1-sulfonate, 3-(4-vinylpyridinium-1-yl)propane-1-sulfonate, or sulfobetaine methacrylate.

The hydrophobic repeat units, constituting 25-75% (e.g., 25-70% and 30-70%) by weight of the statistical copolymer, can be formed independently from styrene, fluorinated styrene, methyl methacrylate, acrylonitrile, or trifluoroethyl methacrylate. They are capable of forming a homopolymer that has a glass transition temperature of 0° C. or higher (e.g., 25° C. or higher, 50° C. or higher, and 25-250° C.).

The statistical copolymer of this invention can be synthesized by free radical copolymerization.

Another aspect of this invention relates to a filtration membrane containing a selective layer formed of a statistical copolymer described above, and, optionally, a support layer. This membrane has a molecular weight cut-off of 100 to 10000 Dalton (e.g., 100 to 5000 Dalton and 100 to 2000 Dalton). The selective layer contains effective pores (i.e., channels that allow molecules or particles to pass through) formed by self-assembly of the zwitterionic repeat units and having an effective pore size (i.e., the minimum size of molecules or particles rejected by a membrane) of 0.5 to 5 nm (e.g., 0.5-3 nm, 0.5-2.5 nm, 0.6-2 nm, and 0.6-1.5 nm). The zwitterionic repeat units form in the selective layer interconnected hydrophilic domains that each have an average diameter of less than 3 nm and provide transport pathways for water.

The optional support layer, on a surface of which the selective layer is disposed, has an effective pore size larger than that of the selective layer and can be formed of polyethersulfone, polyphenylenesulfone, polyphenylenesulfidesulfone, polyacrylonitrile, cellulose ester, polyphenyleneoxide, polypropylene, polyvinyledenefluoride, polyvinylchloride, polyarylsulfone, polyphenylene sulfone, polyetheretherketone, polysulfone, polyamide, polyimide, or a combination thereof.

Notably, the filtration membrane of this invention has an irreversible flux loss that, after a 24-hour filtration of a foulant with a subsequent water-rinsing, is less than 3%. Examples of the foulant include a 1000 mg/L bovine serum albumin solution and a 1500 mg/L oil-in-water emulsion.

Still within the scope of this invention is a method of separating molecules of different molecular weights in a solution. The method includes the steps of (i) providing a filtration membrane described above, (ii) placing onto the filtration membrane a solution containing first molecules that have a molecular weight lower than the molecular weight cut-off of the filtration membrane and second molecules that have a molecular weight higher than the molecular weight cut-off of the filtration membrane, and (iii) allowing the first molecules to pass through the filtration membrane, thereby separating the first molecules from the second molecules. Note that molecules having a plurality of molecular weights lower than the molecular weight cut-off can be separated simultaneously from those having molecular weights higher than the molecular weight cut-off.

The details of one or more embodiments of the invention are set forth in the description and the drawings below. Other features, objects, and advantages of the invention will be apparent from the description, the drawings, and also from the claims.

DETAILED DESCRIPTION

This invention provides a fouling-resistant filtration membrane that has a high water permeability and a high selectivity. This filtration membrane can contain a support layer and a selective layer.

The support layer, providing support for the selective layer, is highly porous and can have a thickness of 10 to 1000 μm (e.g., 15 to 250 μm and 30 to 200 μm).

The support layer can be made of any suitable polymer. See J. Mulder, Basic Principles of Membrane Technology (2nd ed.); and Handbook of Industrial Membrane Technology (M. C. Porter ed., William Andrew Publishing/Noyes 1990). Examples include polyethersulfone, polyphenylenesulfone, polyphenylenesulfidesulfone, polyacrylonitrile, cellulose ester, polyphenyleneoxide, polypropylene, polyvinyledenefluoride, polyvinylchloride, polyarylsulfone, polyphenylene sulfone, polyetheretherketone, polysulfone, polyamide, polyimide, and a combination thereof. Alternatively, the support layer can be made of various porous inorganic materials including ceramics (e.g. titanium oxide and aluminum oxide) and metals (e.g. silver).

The selective layer has a thickness of 0.05 to 50 μm (e.g., 0.05 to 10 μm and 0.05 to 2 μm). It includes effective pores of 0.5 to 5 nm in size and, typically, is essentially free of effective pores larger than 5 nm. It can be a thin, dense film used as a stand-alone (i.e., unsupported) membrane, e.g., secured on the top of a filter holder. Alternatively, it can be coated onto a porous support layer to form thin film composite membranes by methods well-known in the art (e.g. doctor blade coating and spray coating). The selective layer can also form an integrally skinned membrane, in which the selective layer supported by a porous layer is formed in a single step by common membrane formation methods such as phase inversion.

As pointed out above, the selective layer is formed of a statistical copolymer containing zwitterionic repeat units and hydrophobic repeat units, synthesized by well-known methods (e.g. free radical polymerization). Unlike a block copolymer, a statistical copolymer has repeat units in roughly random order. When containing zwitterionic repeat units, this copolymer resists absorption and adhesion of feed components, and thus avoiding fouling.

The ratio between the zwitterionic repeat units and the hydrophobic repeat units is important. If the zwitterionic repeat unit content is too low (e.g., 20% or lower), a membrane formed of the copolymer has a low water permeability, as the zwitterionic repeat units are not sufficient to form interconnected domains having effective pores for water to pass through the membrane. On the other hand, if the zwitterionic repeat unit content is too high (and thus the hydrophobic repeat unit content is too low), a membrane formed of the copolymer dissociates in water, as the hydrophobic repeat units do not form a rigid framework to hold the copolymer together.

The zwitterionic repeat units each contain an equal number of negatively charged functional groups and positively charged functional groups. They self-assemble into interconnected domains having effective pores for water permeation. The effective pore size is typically 0.5-5 nm. This is due to strong interactions between the charged groups. When these effective pores are small enough to reject hydrated $Na^+$ ions, membranes having such pores are useful for desalination. Membranes having larger effective pore sizes can be used to soften water, remove organic compounds above a certain size (e.g. pharmaceuticals) from water, treat wastewater (e.g. textile wastewaters containing dyes), or separate, purify, and exchange solvents (e.g., in the manufacture of pharmaceuticals and biopharmaceuticals).

The hydrophobic repeat units, when in homopolymer form, do not dissolve in water and have a glass transition temperature above the operational temperature of the membrane. These repeat units hold the zwitterionic interconnected domains together and stop the copolymer from dissolving in water. Further, they prevent the excessive swelling of the copolymer.

Membranes made by this method, having a high water permeability (e.g. above 10 $L/m^2 \cdot h \cdot MPa$), are useful for removing salt from water, in applications such as desalination of seawater, wastewater, or brackish water. They are also capable of separating a mixture of two dyes of similar charge but differing molecular size and fractionating two water-soluble organic molecules of different molecular weights.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

Example 1. Synthesis of poly((methyl methacrylate)-random-(sulfobetaine methacrylate)) (PMMA-r-SBMA)

In this example, statistical copolymer PMMA-r-SBMA was synthesized following the procedures described below.

Methyl methacrylate (MMA) was passed through a column of basic activated alumina to remove any inhibitor. SBMA (5 g, 17.9 mmol) was dissolved in dimethyl sulfoxide (DMSO, 100 ml) in a round bottom flask while stirring at 350 rpm. MMA (5 g, 50 mmol), and azobisisobutyronitrile (AIBN, 0.01 g) were added to the flask. The flask was sealed with a rubber septum. Nitrogen was bubbled through the reaction mixture for 20 minutes to purge any oxygen dissolved in the mixture. The flask was then kept at 70° C., while stirring at 350 rpm for at least 16 hours, after which, 0.5 g of 4-methoxyphenol (MEHQ) was added to terminate the reaction. The reaction mixture, which was observed to be viscous, was then precipitated in methanol, purified by stirring two fresh portions of methanol for several hours, followed by drying in the vacuum oven overnight. The copolymer was determined to contain 32 wt % SBMA, measured by $^1$H-NMR.

Example 2. Formation of Thin Film Composite Membranes from PMMA-r-SBMA

In this example, a membrane was prepared using the polymer described in Example 1 as follows.

The copolymer (1 g) was dissolved in trifluoroethanol (TFE, 9 ml) at approximately 50° C. The copolymer solution was passed through a 0.45 micrometer syringe filter and degassed in a vacuum oven for at least 2 hours. The membranes were prepared by coating a thin layer of copolymer solution on a commercially available PVDF400 ultra-filtration membrane using a doctor blade. After coating, the membrane was immersed in a polar non-solvent bath for 20 minutes, followed by immersion in a water bath. A non-solvent in general is a liquid miscible with a copolymer solution and its addition to the copolymer solution results in formation of a polymeric membrane. Either methanol, isopropanol, or acetone was used as a non-solvent. To enhance surface segregation, some of these membranes were annealed in a water bath at 90° C. for 2 hours.

Film thickness and morphology were determined by the examination of freeze-fractured cross-sections of the membranes using a scanning electron microscope (SEM). See FIG. 1.

Figure 1:
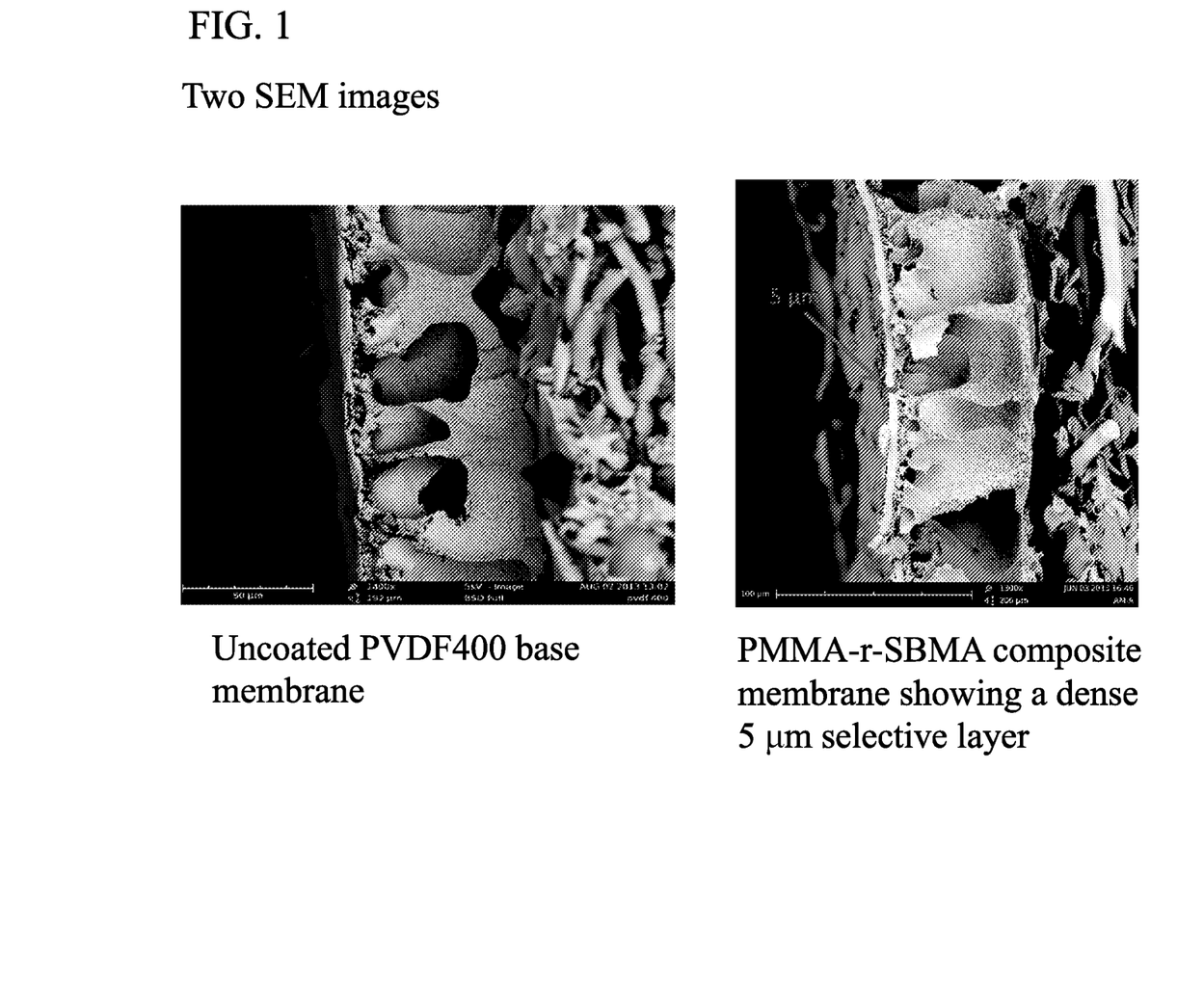
FIG. 1 includes two scanning electron microscope images of filtration membranes of the present invention.

In this figure, two SEM images of the uncoated PVDF400 base membrane (left) and the PMMA-r-SBMA-coated membrane (right) are given at the same magnification. The SEM image of the PMMA-r-SBMA-coated membrane shows a dense coating layer (i.e. having no macroscopic pores) with a thickness of about 5 μm.

Example 3. Synthesis of poly((acrylonitrile)-random-(sulfobetaine methacrylate)) (PAN-r-SBMA)

In this example, statistical copolymer PAN-r-SBMA was synthesized as follows. Acrylonitrile was passed through a column of basic activated alumina to remove any inhibitor. SBMA (4 g, 14.3 mmol) was dissolved in DMSO (100 ml) in a round bottom flask, while stirring at 350 rpm. Acrylonitrile (6 g, 113 mmol), and AIBN (0.01 g) were added to the flask. The flask was sealed with a rubber septum. Nitrogen was bubbled through the reaction mixture for 20 minutes to purge any dissolved oxygen. The flask was then kept at 70° C. while stirring at 350 rpm for at least 16 hours, after which 0.5 g of MEHQ was added to terminate the reaction. The reaction mixture was observed to be viscous. The copolymer was then precipitated in methanol, purified by leaching in two fresh portions of methanol for several hours, followed by drying in the vacuum oven overnight. The copolymer was determined to contain 44 wt % SBMA measured by $^1$H-NMR.

Example 4. Formation of Thin Film Composite Membranes from PAN-r-SBMA

In this example, a membrane was prepared using the copolymer described in Example 3. The copolymer (1 g) was dissolved in TFE (9 ml) at approximately 50° C. The copolymer solution was passed through a 0.45 micrometer syringe filter and subsequently degassed in a vacuum oven for at least 2 hours. The membranes were prepared by coating a thin layer of copolymer solution on a commercially available PAN400 ultrafiltration membrane using a doctor blade. After coating, the membrane was immersed in a polar non-solvent bath for 20 minutes, followed by immersion in a water bath. Either methanol, isopropanol, or acetone was used as a non-solvent. To enhance surface segregation, some of these membranes were annealed in a water bath at 90° C. for 2 hours.

Note that the copolymer used to prepare the membrane in this Example has an SBMA content as high as 44 wt %. This copolymer is not soluble in commonly used organic solvents except TFE due to its high SBMA content.

Example 5. Synthesis of poly((trifluoroethyl methacrylate)-random-(sulfobetaine methacrylate)) (PTFEMA-r-SBMA)

In this example, statistical copolymer poly(PTFEMA-r-SBMA) was synthesized as follows. 2,2,2-Trifluoroethyl methacrylate (TFEMA) and SBMA was passed through a column of basic activated alumina to remove any inhibitor. SBMA (5 g, 17.9 mmol) was dissolved in DMSO (100 ml) in a round bottom flask while stirring at 350 rpm. TFEMA (5 g, 29.7 mmol), SBMA (5 g, 17.9 mmol), and AIBN (0.01 g) were added to the flask. The flask was sealed with a rubber septum. Nitrogen was bubbled through the reaction mixture for 20 minutes to purge any dissolved oxygen. The flask was then kept at 70° C. while stirring at 350 rpm for at least 16 hours, after which, 0.5 g of MEHQ was added to terminate the reaction. The reaction mixture was first precipitated in methanol. Some polymer material was settled at the bottom, but the rest of the solution was still cloudy. The polymer in the bottom was collected separately and purified by stirring two fresh portions of methanol for several hours, followed by drying in the vacuum oven overnight. Methanol was boiled off from the rest of the cloudy solution, and the solution re-dissolved in DMSO. The solution was further precipitated in a 1:1 ratio of methanol and tetrahydrofuran. It was then purified by stirring in methanol for several hours, followed by drying in the vacuum oven overnight. The copolymer was determined to contain 43 wt % SBMA, measured by $^1$H-NMR.

P50, P40, and P30 were PTFEMA-r-SBMA copolymers containing 47 wt %, 36 wt %, and 25 wt % SBMA, respectively. The morphology of the self-assembled structure of PTFEMA-r-SBMA copolymers was characterized by transmission electron microscopy (TEM). See FIG. 2. In this figure, Graph 2a shows schematically that a copolymer (left) undergoing self-assembly to form the proposed nanostructure (right), featuring continuous networks of zwitterionic and hydrophobic domains; Graph 2b shows the chemical structure of PTFEMA-r-SBMA; and Graphs 2c and 2d show TEM images of P50 and P30, respectively.

Figure 2:
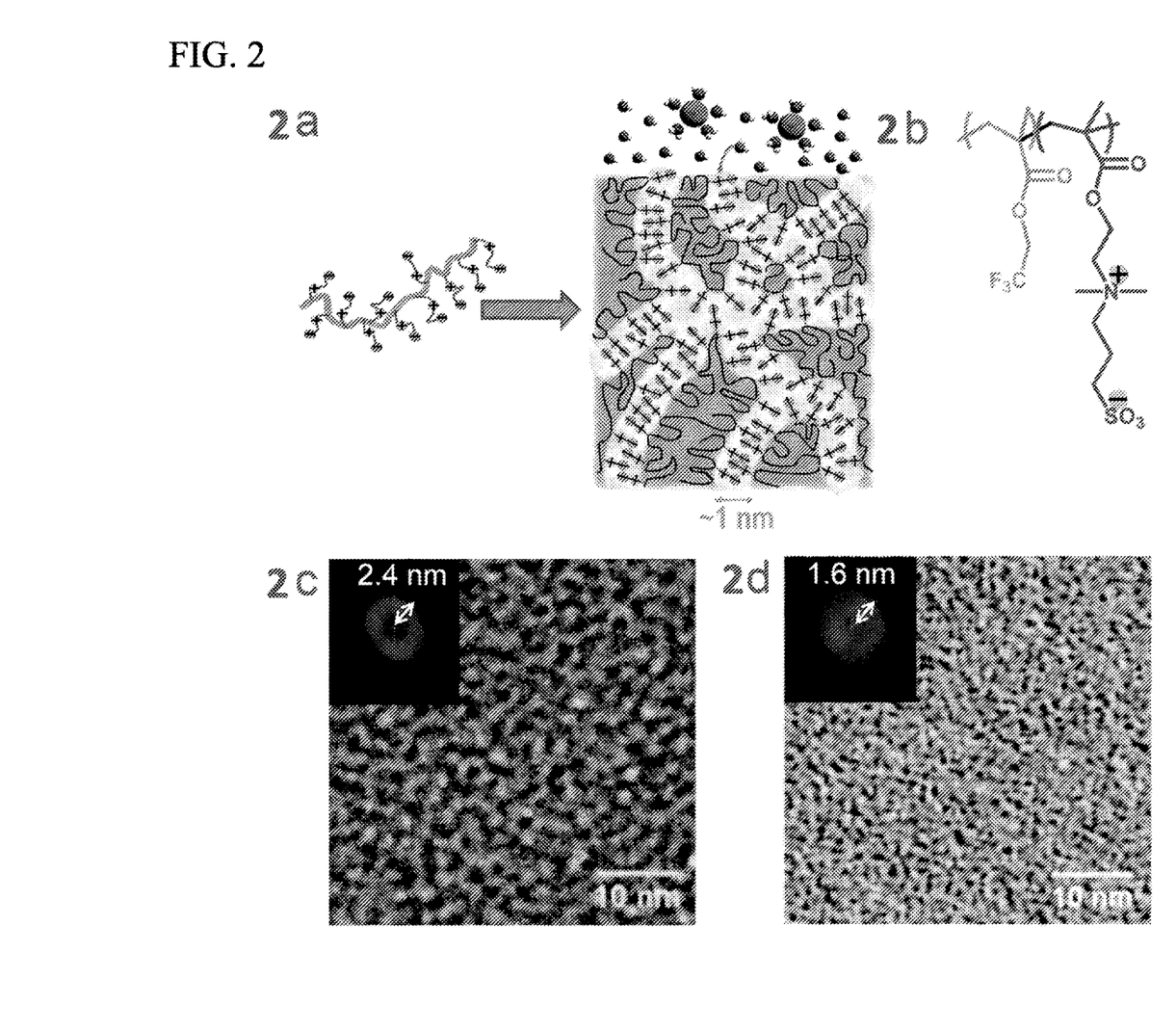
FIG. 2 includes two schematic diagrams (2a and 2b) and two transmission electron microscopy images (2c and 2d) of statistical copolymers of the present invention.

The TEM images show that the zwitterionic repeat units formed interconnected hydrophilic domains in P50 better than in P30 which had an insufficient SBMA content. This finding is supported by the amount of water the copolymers could take up when soaked for 24 hours. Water uptake is closely correlated with the zwitterionic content in copolymers. Namely, P50 and P40 took up 37 and 27 wt % of water, while the uptake for P30 was negligible. At a low zwitterion content, water was not able to effectively penetrate the copolymer due to the poor connectivity between the hydrophilic domains formed by zwitterionic repeat units.

Example 6. Formation of Thin Film Composite Membranes from PTFEMA-r-SBMA

In this example, a membrane was prepared using the copolymer described in Example 5. The copolymer (1 g) was dissolved in TFE (9 ml) at approximately 50° C. The copolymer solution was passed through a 0.45 micrometer syringe filter and degassed in a vacuum oven for at least 2 hours. The membranes were prepared by coating a thin layer of copolymer solution on a PVDF400 ultrafiltration membrane using a doctor blade. After coating, the membrane was immersed in a polar non-solvent bath for 20 minutes, followed by immersion in a water bath. Either methanol, isopropanol, or acetone was used as a non-solvent. To enhance surface segregation, some of these membranes were annealed in a water bath at 90° C. for 2 hours.

PTFEMA-r-SBMA membranes with varying SBMA contents were prepared from P50, P40, and P30.

Film thickness and morphology were determined by SEM imaging of freeze-fractured cross-sections of the membranes. See FIG. 3.

Figure 3:
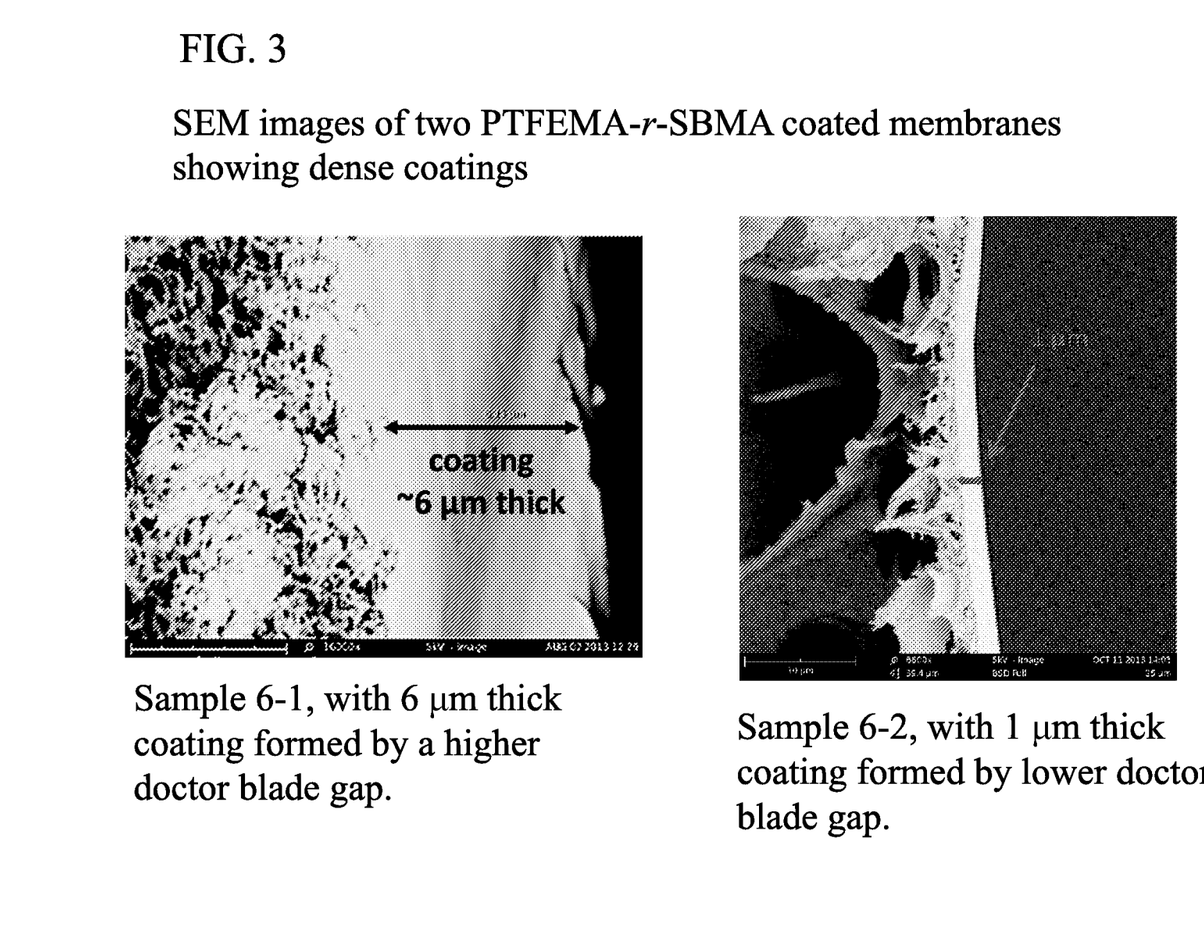
FIG. 3 includes two scanning electron microscope images of PTFEMA-r-SBMA-coated membranes of the present invention.

In this figure, SEM images of two samples of coated membranes with different coating thicknesses are shown. The coating thickness varies between 6 μm (sample 6-1, formed using a 50 μm doctor blade gap) and 1 μm (formed using a 25 μm doctor blade gap) depending on the doctor blade setting and the selection of non-solvent. Also in this figure, the left image shows a membrane, i.e., Sample 6-1, having a selective layer of 6 μm and the right image shows a membrane, i.e., Sample 6-2, having a selective layer of 1 μm. Both selective layers are dense and do not contain large pores.

Example 7. Synthesis of poly((trifluoroethyl methacrylate)-random-(3-(2-vinylpyridinium-1-yl)propane-1-sulfonate)) (PTFEMA-r-SB2VP) and Formation of Thin Film Composite Membranes from PTFEMA-r-SB2VP In this example, statistical copolymer PTFEMA-r-SB2VP was synthesized as follows. Pyridine-based zwitterionic molecules including 3-(2-vinylpyridinium-1-yl)propane-1-sulfonate (SB2VP) were first prepared according to the procedure described in Purdy and Kuyinu, Polymer Preprints (2009) 50(2), 677-678.

SB2VP (10 g, 43.9 mmol) was dissolved in 65 ml of TFE in a round bottom flask. TFEMA (10 g, 59.5 mmol) was added to the mixture, followed by AIBN (0.01 g). Nitrogen was bubbled for 20 minutes to remove any dissolved oxygen. The reaction mixture was placed in an oil bath at 70° C. for at least 16 hours after which 0.5 g of MEHQ was added to terminate the reaction. The reaction mixture was first precipitated in ethanol (~1200 ml) and then washed twice in deionized water, followed by drying in a vacuum oven overnight. The copolymer contained 36 wt % SB2VP, measured by $^1$H-NMR using DMSO-$d_6$.

A membrane was subsequently prepared using PTFEMA-r-SB2VP thus synthesized following the procedure described in Example 6.

Example 8. Synthesis of poly((acrylonitrile)-random-(3-(4-vinylpyridinium-1-yl)propane-1-sulfonate)) (PAN-r-SB4VP) and Formation of Thin Film Composite Membranes from PAN-r-SB4VP In this example, statistical copolymer PAN-r-SB4VP was synthesized as follows. 3-(4-vinylpyridinium-1-yl)propane-1-sulfonate (SB4VP) (10 g, 43.9 mmol) was dissolved in 65 ml of TFE in a round bottom flask. AN (10 g, 0.19 mol) was added to the mixture, followed by AIBN (0.01 g). Nitrogen was bubbled for 20 minutes to remove any dissolved oxygen. The reaction mixture was placed in an oil bath at 70° C. for at least 16 hours after which 0.5 g of MEHQ was added to terminate the reaction. The reaction mixture was first precipitated in ethanol (~1200 ml) and then washed twice in deionized water, followed by drying in a vacuum oven overnight. NMR performed in HFIP-d2 (1,1,1,3,3,3-hexafluoro-2-propanol) showed successful copolymerization of PAN-r-SB4VP.

A membrane was subsequently prepared using PAN-r-SB4VP thus synthesized following the procedure described in Example 6.

Example 9. Water Permeability of SBMA Copolymer Membranes

In this example, the pure water fluxes through the membranes described in Examples 2, 4, and 6 (Sample 6-1) were measured using an Amicon 8010 stirred, dead-end filtration cell with a cell volume of 10 mL and an effective filtration area of 4.1 cm². The cell was stirred at 500 rpm, and the test was performed at 20 psi. After a stabilization period of at least one hour, a sample of the permeate was collected over 10 minutes and weighed. The value obtained was divided by filtration area and experiment time to obtain flux. The flux value was normalized by pressure to obtain pure water permeance. See Table 1 below.

TABLE 1

Water permeance of the three copolymer membranes before and after annealing

| Copolymer | SBMA content (wt %) | Permeance of unannealed membrane ($L \cdot m^{-2}h^{-1}bar^{-1}$) | Permeance of annealed membrane ($L \cdot m^{-2}h^{-1}bar^{-1}$) |
| --- | --- | --- | --- |
| PMMA-r-SBMA | 32 | 3.4 | 14.9 |
| PTFEMA-r-SBMA | 43 | 3.2 | 21 |
| PAN-r-SBMA | 44 | 1 | 5.8 |

The experiment was performed on both as-cast membranes, and on membranes that were annealed in water at 90° C. for 2 hours. Unexpectedly, high permeabilities were achieved with these membranes, despite the thick coatings, which were as thick as 6 nm.

Example 10. Dye Rejection by SBMA Copolymer Membranes

Membranes prepared as described in Examples 2, 4, and 6 (Sample 6-1) were used in studies aimed at identifying their effective pore size, or size cut-off.

Figure 4:
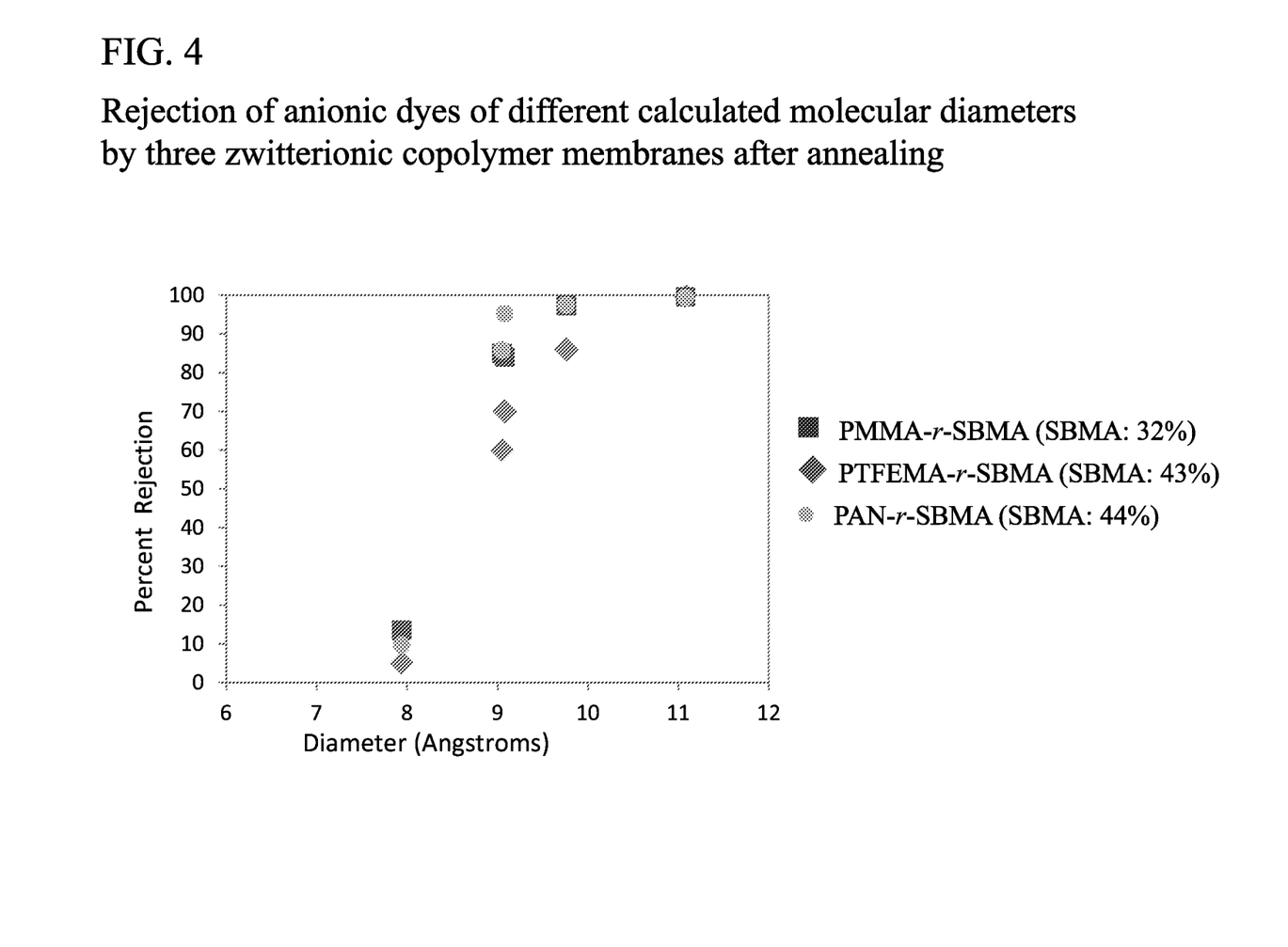
FIG. 4 includes a graph showing results from rejection studies on three filtration membranes of the present invention.

Dye molecules were used in this study. The rejection studies were performed on an Amicon 8010 stirred, dead-end filtration cell with a cell volume of 10 mL and an effective filtration area of 4.1 cm². The cell was stirred at 500 rpm, and the test was performed at 20 psi. The cell was stirred at 500 rpm to minimize concentration polarization effects. After running pure water through the membrane for at least an hour, the cell was emptied, and a 100 mg/L solution of the probe dye in water was placed in the cell. After an equilibration period of at least an hour, a sample was collected until enough was obtained for analysis by UV-Visible spectrophotometry. The cell was rinsed several times with water. Pure water was filtered through the membrane until the permeate was completely clear before switching to a new probe dye. FIG. 4 shows the rejection of various negatively charged dyes by the membranes made from the three copolymers mentioned in Examples 1, 3, and 5.

The dye diameter was calculated using the molecular volume values obtained by Molecular Modeling Pro software by ChemSW. Based on the filtration of these anionic dyes, the size cut-off of the membranes is estimated to be between 0.9 and 1.1 nm. Furthermore, the rejection of these dyes is related directly with the molecular size of the dye rather than its charge. See Table 2 below. Thus, these membranes can be used for size-selective separations with unexpectedly high selectivity.

TABLE 2

Molecular size and charge of dyes used in testing the effective pore size, and their rejection by the three membranes described in Example 8

| Dye name | Calculated molecular size (Å) | Net charge | Rejection (%) | | |
|---|---|---|---|---|---|
| | | | PMMA-r-SBMA | PAN-r-SBMA | PTFEMA-r-SBMA |
| Brilliant Blue R | 11.08 | −1 | 99.6 | 99.4 | 99.8 |
| Congo Red | 10.05 | −2 | n/a$^a$ | n/a$^a$ | n/a$^a$ |
| Reactive Red 120 | 9.76 | −6 | 97.3 | 97.5 | 86 |
| Reactive Black 5 | 9.08 | −4 | 84 | 95.3 | 70 |
| Amaranth | 9.05 | −3 | 85 | 85.8 | 60 |
| Acid Blue 45 | 8.41 | −2 | n/a$^a$ | n/a$^a$ | n/a$^a$ |
| Methyl Orange | 7.94 | −1 | 13.5 | 9.7 | 5.1 |

$^a$The assay was not performed.

Example 11. Dye Rejection by Statistical Copolymer Membranes and a Commercial Membrane In this example, a commercial membrane and membranes prepared as described in Examples 6, 7, and 8 were used in experiments aimed at identifying their effective pore size or size cut-off.

Figure 5:
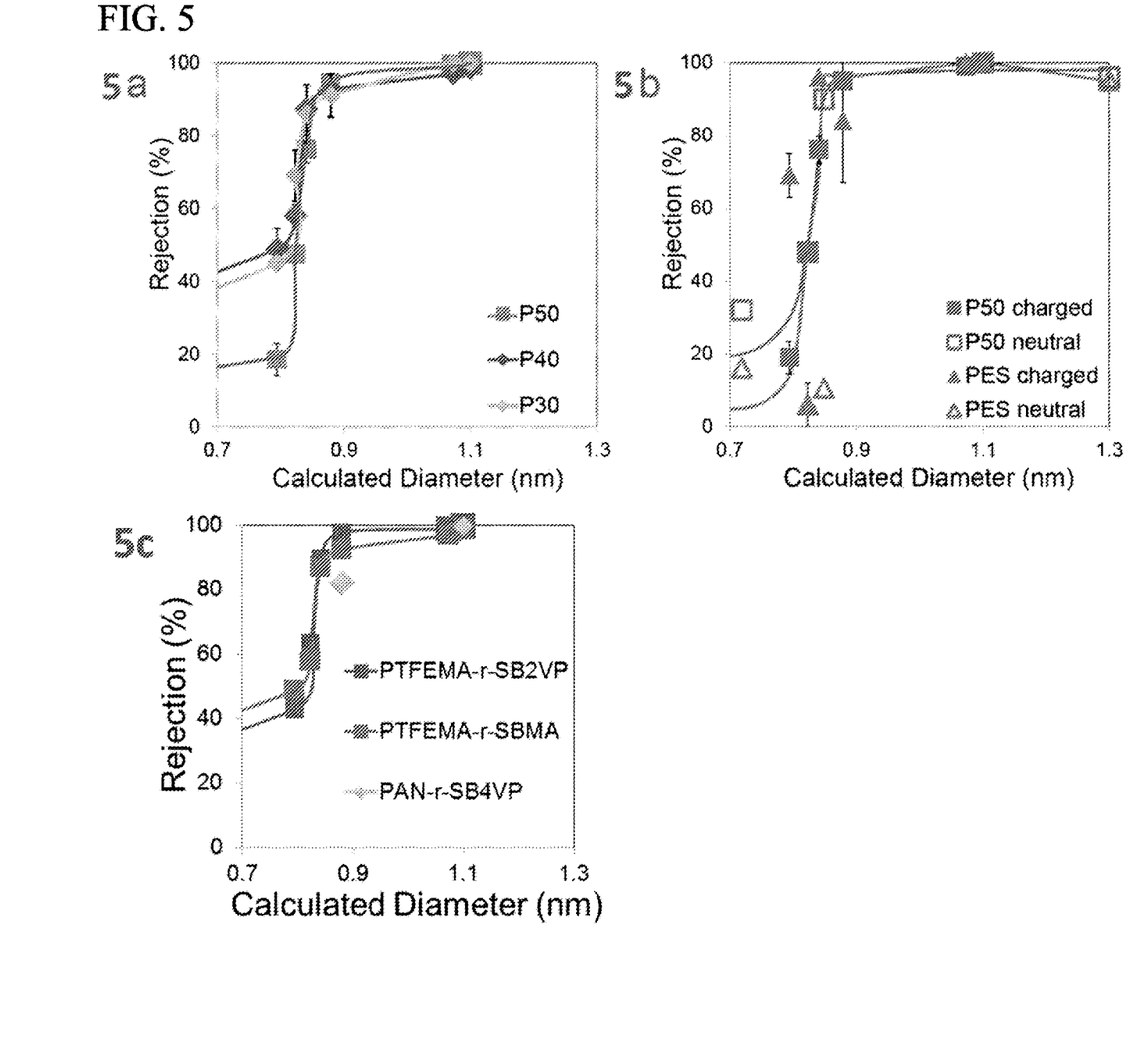
FIG. 5 includes three graphs (5a, 5b, and 5c) showing results from rejection studies on filtration membranes of the present invention and a commercial membrane.

Three rejection studies were performed according to the procedure described in Example 10. The results are shown in FIG. 5.

Graph 5a shows rejection rates of anionic dyes by PTFEMA-r-SBMA membranes with varying SBMA contents, i.e., P50 (47 wt % SBMA), P40 (36 wt % SBMA), and P30 (25 wt % SBMA)-coated membranes. All three membranes show a size-based cut-off. The results indicate that the copolymer composition in a filtration membrane does not significantly affect the size-based cut-off. Graph 5b shows a comparative study of rejecting charged and neutral dyes between a P50-coated membrane and a commercial PES membrane (PES 1 kDa UF). A rejection curve could be plotted for the P50-coated membrane in rejecting dyes, either charged or neutral, indicating a size-based selectivity. By contrast, the commercial PES membrane did not show a size-based selectivity in rejecting dyes as no fitting curve could be plotted. Finally, Graph 5c shows a comparative study of rejecting anionic dyes between a PTFEMA-r-SBMA membrane and membranes prepared from a pyridine-based copolymer, i.e., PTFEMA-r-SB2VP and PAN-r-SB4VP. All membranes showed essentially similar size cut-off.

Example 12. Salt Rejection by SBMA Copolymer Membranes

In this example, membranes prepared as described in Examples 2, 4, and 6 (Sample 6-1) were used in experiments to determine their salt rejection properties. The rejection studies were performed on an Amicon 8010 stirred, dead-end filtration cell with a cell volume of 10 mL and an effective filtration area of 4.1 cm$^2$. The cell was stirred at 500 rpm, and the test was performed at 20 psi. The cell was stirred at 500 rpm to minimize concentration polarization effects. After running pure water through the membrane for at least an hour, the cell was emptied, and a 200 mg/L solution of magnesium sulfate in water was placed in the cell. After an equilibration period of at least an hour, a sample was collected until enough was obtained for analysis by a standard conductivity probe. The cell was rinsed several times with water, and pure water was run through the membrane before switching to other feed solutions.

Unexpectedly, MgSO$_4$ salt rejection was 13%, 17.4%, and 11% by PMMA-r-SBMA (32 wt % SBMA), PTFEMA-r-SBMA (43 wt % SBMA), and PAN-r-SBMA (44 wt % SBMA) respectively.

Example 13. Anti-Fouling Properties of SBMA Copolymer Membranes

In this study, either a 1000 mg/L bovine serum albumin solution or a 1500 mg/L oil-in-water emulsion was used as a foulant to test the fouling resistance of a PTFEMA-r-SBMA membrane.

The study was conducted as follows. First, deionized (DI) water was filtered through a membrane until its stabilized flux was measured. Next, the membrane was used in filtration of a foulant solution. After 24 hours, the membrane was rinsed with DI water followed by a test to determine its flux loss. A commercial PES membrane was used as a control.

When a 1000 mg/L bovine serum albumin solution was used as a foulant, a tested P40-coated membrane showed only a small decline in its flux (7% over 24 hours). The flux was fully recovered (>99%) after the membrane was water-rinsed. By contrast, the commercial PES membrane exhibited a flux decline of 41%, which was not recovered after a water rinse.

Similar results were obtained from a study using a 1500 mg/L oil-in-water emulsion as a foulant. A tested P50-coated membrane exhibited exceptional fouling resistance. The flux decline was only 4% and was completely recovered after rinsing with water. In the same study, a commercial PES membrane lost 88% of its flux irreversibly.

Example 14. Contact Angle of PAN-r-SBMA Surfaces

In this example, the surface properties of membranes prepared as described in Example 4 was analyzed using a goniometer. As an indicator of the hydrophilicity of the materials, sessile drop contact angle measurements were performed on unannealed as well as annealed samples. It was observed that the contact angle of the unannealed surface was around 64° whereas that of the annealed sample was around 35°. The unexpectedly much lower contact angle of the latter sample suggested the higher hydrophilicity of the copolymer coating after annealing.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Indeed, to achieve the purpose of purification and separation, one skilled in the art can design a membrane that contains any combination of zwitterionic repeat units and hydrophobic repeat units. Further, the ratios and molecular weights of these repeat units can be so engineered to achieve separation of molecules of different molecular weights.

From the above description, a skilled artisan can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A statistical copolymer comprising
   zwitterionic repeat units, each containing independently sulfobetaine, carboxybetaine, phosphorylcholine, or pyridinium alkyl sulfonate, and
   hydrophobic repeat units, each formed independently from styrene, fluorinated styrene, methyl methacrylate, acrylonitrile, or trifluoroethyl methacrylate,
   wherein the statistical copolymer has a molecular weight of 10,000 to 10,000,000 Dalton, the zwitterionic repeat units and the hydrophobic repeat units each constitute 25-75% by weight of the statistical copolymer, and the hydrophobic repeat units are capable of forming a homopolymer that has a glass transition temperature of 0° C. or higher.

2. The statistical copolymer of claim 1, wherein the statistical copolymer has a molecular weight of 20,000 to 2,000,000 Dalton, the zwitterionic repeat units constitute 30-75% by weight of the statistical copolymer, and the hydrophobic repeat units constitute 25-70% by weight of the statistical copolymer.

3. The statistical copolymer of claim 2, wherein the statistical copolymer has a molecular weight of 30,000 to 500,000 Dalton, the zwitterionic repeat units constitute 30-70% by weight of the statistical copolymer, and the hydrophobic repeat units constitute 30-70% by weight of the statistical copolymer.

4. The statistical copolymer of claim 3, wherein the glass transition temperature is 25° C. or higher.

5. The statistical copolymer of claim 2, wherein the glass transition temperature is 25° C. or higher.

6. The statistical copolymer of claim 1, wherein the zwitterionic repeat units each are formed independently from sulfobetaine acrylate, sulfobetaine acrylamide, phosphorylcholine acrylate, phosphorylcholine acrylamide, phosphorylcholine methacrylate, carboxybetaine acrylate, carboxybetaine methacrylate, carboxybetaine acrylamide, 3-(2-vinylpyridinium-1-yl)propane-1-sulfonate, 3-(4-vinylpyridinium-1-yl)propane-1-sulfonate, or sulfobetaine methacrylate; and the hydrophobic repeat units each are formed independently from methyl methacrylate, acrylonitrile, or trifluoroethyl methacrylate.

7. The statistical copolymer of claim 6, wherein the statistical copolymer has a molecular weight of 20,000 to 2,000,000 Dalton, the zwitterionic repeat units constitute 30-75% by weight of the statistical copolymer, and the hydrophobic repeat units constitute 25-70% by weight of the statistical copolymer.

8. The statistical copolymer of claim 7, wherein the statistical copolymer has a molecular weight of 30,000 to 500,000 Dalton, the zwitterionic repeat units constitute 30-70% by weight of the statistical copolymer, and the hydrophobic repeat units constitute 30-70% by weight of the statistical copolymer.

9. A method of separating molecules in a solution, the method comprising:
   providing a filtration membrane;
   placing onto the filtration membrane a solution containing first molecules that have a molecular weight lower than the molecular weight cut-off of the filtration membrane and second molecules that have a molecular weight higher than the molecular weight cut-off of the filtration membrane; and
   allowing the first molecules to pass through the filtration membrane, thereby separating the first molecules from the second molecules;
   wherein the filtration membrane comprises a selective layer formed of a statistical copolymer comprising zwitterionic repeat units and hydrophobic repeat units, wherein the filtration membrane has a molecular weight cut-off of 100 to 10000 Dalton, the selective layer contains effective pores formed by self-assembly of the zwitterionic repeat units and having effective pore sizes of 0.5 to 3 nm, and the statistical copolymer has a molecular weight of 10,000 to 10,000,000 Dalton, the zwitterionic repeat units and the hydrophobic repeat units each constituting 25-75% by weight of the statistical copolymer, and the hydrophobic repeat units being capable of forming a homopolymer that has a glass transition temperature of 0° C. or higher.

10. The method of claim 9, wherein the filtration membrane further comprises a support layer, wherein the selective layer is disposed on a surface of the support layer;
    the support layer has an effective pore size larger than that of the selective layer; and
    the support layer is made of a ceramic.

11. The method of claim 10, wherein the ceramic is titanium oxide or aluminum oxide.

12. The method of claim 9, wherein the zwitterionic repeat units each are formed independently from sulfobetaine, carboxybetaine, phosphorylcholine, or pyridinium alkyl sulfonate; and the hydrophobic repeat units each are formed independently from styrene, fluorinated styrene, methyl methacrylate, acrylonitrile, or trifluoroethyl methacrylate.

13. The method of claim 12, wherein the zwitterionic repeat units each are formed independently from sulfobetaine acrylate, sulfobetaine acrylamide, phosphorylcholine acrylate, phosphorylcholine acrylamide, phosphorylcholine methacrylate, carboxybetaine acrylate, carboxybetaine methacrylate, carboxybetaine acrylamide, 3-(2-vinylpyridinium-1-yl)propane-1-sulfonate, 3-(4-vinylpyridinium-1-yl)propane-1-sulfonate, or sulfobetaine methacrylate; and the hydrophobic repeat units each are formed independently from methyl methacrylate, acrylonitrile, or trifluoroethyl methacrylate.

14. The method of claim 13, wherein the statistical copolymer has a molecular weight of 20,000 to 2,000,000 Dalton, the zwitterionic repeat units constitute 30-75% by weight of the statistical copolymer, and the hydrophobic repeat units constitute 25-70% by weight of the statistical copolymer.

15. The method of claim 14, wherein the statistical copolymer has a molecular weight of 30,000 to 500,000 Dalton, the zwitterionic repeat units constitute 30-70% by weight of the statistical copolymer, and the hydrophobic repeat units constitute 30-70% by weight of the statistical copolymer.

16. A filtration membrane comprising a selective layer formed of a statistical copolymer comprising zwitterionic repeat units and hydrophobic repeat units, wherein the filtration membrane has a molecular weight cut-off of 100 to 10000 Dalton, the selective layer contains effective pores formed by self-assembly of the zwitterionic repeat units and having effective pore sizes of 0.5 to 3 nm, and the statistical copolymer has a molecular weight of 10,000 to 10,000,000 Dalton, the zwitterionic repeat units and the hydrophobic repeat units each constituting 25-75% by weight of the statistical copolymer, and the hydrophobic repeat units being capable of forming a homopolymer that has a glass transition temperature of 0° C. or higher;

wherein the filtration membrane further comprises a support layer, wherein the selective layer is disposed on a surface of the support layer;

the support layer has an effective pore size larger than that of the selective layer; and the support layer is made of a ceramic.

17. The filtration membrane of claim 16, wherein the ceramic is titanium oxide or aluminum oxide.

18. The filtration membrane of claim 17, wherein the zwitterionic repeat units each are formed independently from sulfobetaine, carboxybetaine, phosphorylcholine, or pyridinium alkyl sulfonate; and the hydrophobic repeat units each are formed independently from styrene, fluorinated styrene, methyl methacrylate, acrylonitrile, or trifluoroethyl methacrylate.

19. The filtration membrane of claim 18, wherein the zwitterionic repeat units each are formed independently from sulfobetaine acrylate, sulfobetaine acrylamide, phosphorylcholine acrylate, phosphorylcholine acrylamide, phosphorylcholine methacrylate, carboxybetaine acrylate, carboxybetaine methacrylate, carboxybetaine acrylamide, 3-(2-vinylpyridinium-1-yl)propane-1-sulfonate, 3-(4-vinylpyridinium-1-yl)propane-1-sulfonate, or sulfobetaine methacrylate; and the hydrophobic repeat units each are formed independently from methyl methacrylate, acrylonitrile, or trifluoroethyl methacrylate.

20. The filtration membrane of claim 16, wherein the zwitterionic repeat units each are formed independently from sulfobetaine, carboxybetaine, phosphorylcholine, or pyridinium alkyl sulfonate; and the hydrophobic repeat units each are formed independently from styrene, fluorinated styrene, methyl methacrylate, acrylonitrile, or trifluoroethyl methacrylate.

21. The filtration membrane of claim 20, wherein the zwitterionic repeat units each are formed independently from sulfobetaine acrylate, sulfobetaine acrylamide, phosphorylcholine acrylate, phosphorylcholine acrylamide, phosphorylcholine methacrylate, carboxybetaine acrylate, carboxybetaine methacrylate, carboxybetaine acrylamide, 3-(2-vinylpyridinium-1-yl)propane-1-sulfonate, 3-(4-vinylpyridinium-1-yl)propane-1-sulfonate, or sulfobetaine methacrylate; and the hydrophobic repeat units each are formed independently from methyl methacrylate, acrylonitrile, or trifluoroethyl methacrylate.

* * * * *